(12) United States Patent
Marappan

(10) Patent No.: US 8,054,514 B2
(45) Date of Patent: Nov. 8, 2011

(54) MULTIPLE DOCUMENT SCANNING

(75) Inventor: Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/157,246

(22) Filed: Jun. 9, 2008

(65) Prior Publication Data

US 2008/0247005 A1    Oct. 9, 2008

(51) Int. Cl.
*H04N 1/04* (2006.01)

(52) U.S. Cl. ........ 358/474; 358/453; 358/497; 358/486; 358/1.15; 382/305; 382/209

(58) Field of Classification Search .................. 358/474, 358/486, 453, 538, 501, 1.15, 514, 475, 497, 358/496; 382/305, 209, 218, 289
See application file for complete search history.

(56) References Cited

U.S. PATENT DOCUMENTS

| | | | |
|---|---|---|---|
| 5,270,899 A * | 12/1993 | Saito ............................. | 361/151 |
| 5,696,609 A | 12/1997 | Cresens et al. | |
| 5,786,905 A | 7/1998 | Kaji et al. | |
| 5,819,664 A | 10/1998 | Steckler | |
| 5,875,305 A * | 2/1999 | Winter et al. ................. | 709/231 |
| 5,901,253 A * | 5/1999 | Tretter .......................... | 382/289 |
| 6,055,070 A | 4/2000 | Kang | |
| 6,430,320 B1 * | 8/2002 | Jia et al. ........................ | 382/289 |
| 6,750,987 B1 * | 6/2004 | Murata ......................... | 358/474 |
| 6,801,343 B1 | 10/2004 | Sheng | |
| 2001/0014183 A1 * | 8/2001 | Sansom-Wai et al. ........ | 382/289 |
| 2001/0030685 A1 * | 10/2001 | Darbin et al. .................. | 348/96 |
| 2002/0196882 A1 * | 12/2002 | Wang et al. .................... | 375/355 |
| 2003/0059111 A1 * | 3/2003 | Druitt et al. ................... | 382/173 |
| 2003/0161010 A1 * | 8/2003 | Schinner ....................... | 358/474 |
| 2004/0165223 A1 * | 8/2004 | Ishido et al. ................... | 358/449 |
| 2004/0202385 A1 * | 10/2004 | Cheng et al. .................. | 382/305 |
| 2004/0239763 A1 * | 12/2004 | Notea et al. ................... | 348/169 |
| 2005/0041045 A1 * | 2/2005 | Plut .............................. | 345/660 |
| 2005/0093865 A1 * | 5/2005 | Jia ................................ | 345/426 |
| 2005/0157944 A1 * | 7/2005 | Chung .......................... | 382/282 |
| 2007/0070415 A1 | 3/2007 | Minato | |
| 2007/0279706 A1 | 12/2007 | Noda | |
| 2008/0068674 A1 * | 3/2008 | McIntyre ....................... | 358/474 |
| 2009/0190187 A1 * | 7/2009 | Cornell et al. ................ | 358/474 |
| 2011/0122432 A1 * | 5/2011 | Do et al. ....................... | 358/1.15 |

OTHER PUBLICATIONS

Non-Final Office Action Mar. 30, 2009 U.S. Appl. No. 11/260,573.

* cited by examiner

*Primary Examiner* — Negussie Worku
(74) *Attorney, Agent, or Firm* — David A. Mims, Jr.; Mark Vallone; Robert V. Wilder

(57) ABSTRACT

A system and methodology enables the scanning of multiple documents in a single pass of a flat bed scanner. Multiple documents are placed on the scanner surface with a predetermined amount of vertical and horizontal spacing separating the documents. The scanning device is enabled to detect and open separate windows for each of the multiple documents and selectively present a preview of the image to the user. User selections allow the multiple documents to be created as multiple separate documents or files.

13 Claims, 5 Drawing Sheets

MULTIPLE DOCUMENT SCANNING

CROSS REFERENCE TO RELATED APPLICATIONS

This application is related to application Ser. No. 11/260,573 which was filed on Oct. 27, 2005 and is now abandoned.

FIELD OF THE INVENTION

The present invention relates generally to information processing systems and more particularly to a system and methodology for enabling a scanning of multiple documents in a single pass.

BACKGROUND OF THE INVENTION

Currently flat bed scanners can scan only one document at a time. However, there are many situations where several documents need to be scanned using flat bed scanners. In such situations the flat bed scanner user is forced to scan one document at a time. Irrespective of the number of documents scanned, the scan head of the flat bed scanner passes beneath the entire scanned glass surface even when only one document is scanned and the document is much smaller in area than the scanned surface. This is an inefficient process and results in wasting time and resources when multiple documents need to be scanned.

Thus, there is a need for an improved methodology and system for enabling the scanning of multiple documents in one pass of a document scanning device.

SUMMARY OF THE INVENTION

A system and methodology enables the scanning of multiple documents in a single pass of a flat bed scanner. Multiple documents are placed on the scanner surface. The scanning device is enabled to detect and open separate windows for each of the multiple documents and selectively present a preview of the image to the user. User selections allow the multiple documents to be created as multiple separate documents or files.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
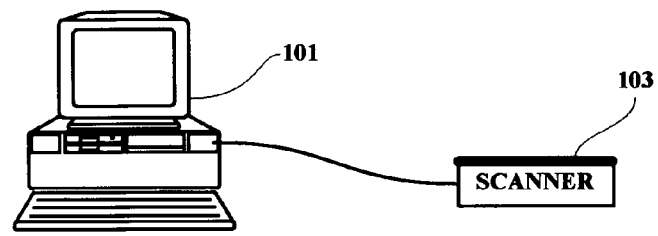
FIG. 1 is an illustration of a computer system coupled to a scanning device.

The following disclosure explains a mechanism where flat bed scanners with some hardware and software enhancements are enabled to scan multiple documents in a single pass. In one embodiment where multiple documents are placed on the scan surface, the scanning system is enabled to create a separate software page or file for each document placed on the scan surface. It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

In FIG. 1, there is shown a computer system 101 coupled to a scanning device 103 which may be used in practicing the methodology of the present invention. Several of the major components of the computer system 101 are illustrated in block diagram form in FIG. 2.

Figure 2:
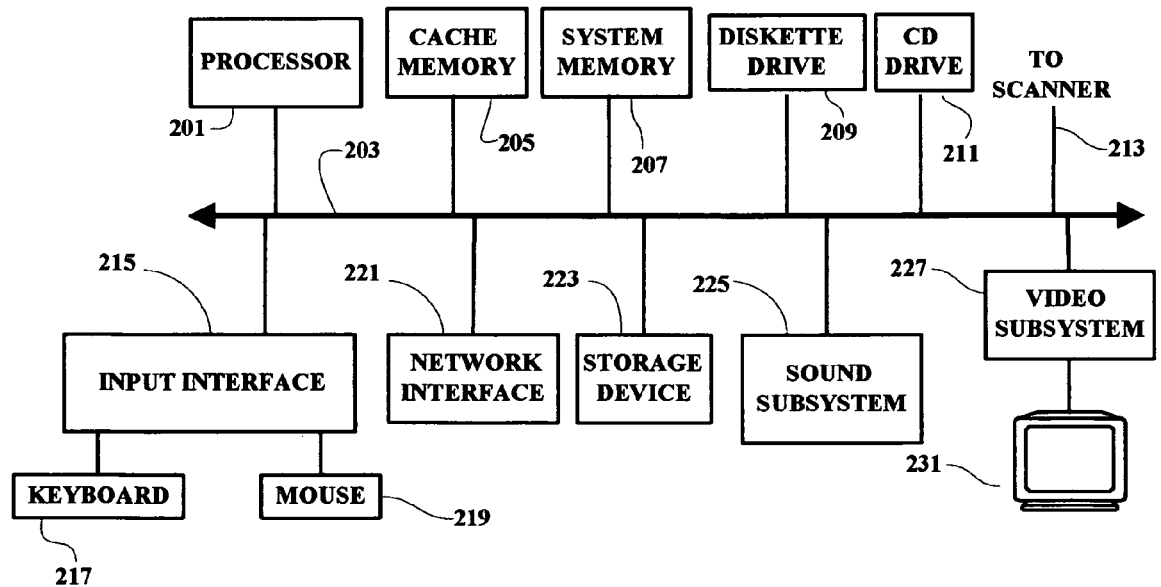
FIG. 2 is a block diagram illustrating several of the major components of the computer system shown in FIG. 1.

As shown in FIG. 2, a processor 201 is connected to a system bus 203. Also connected to the system bus 203 are a cache memory 205, a system memory 207, a diskette drive 209, a CD drive 211 and connection means 213 for connecting the computer system to the scanning device or scanner 103. The computer system also includes an input interface 215 which enables user input to the system through various user input means including a keyboard 217 and/or a mouse or pointer device 219. The system bus is also connected to a network through a network interface 221. The computer system also includes a storage device 223, a sound subsystem 225 and a video subsystem 227 including a display device 231. The computer system illustrated in FIG. 2 need not include all of the components illustrated, and may include other components and connections which are not illustrated, in order to practice the present invention.

Figure 3:
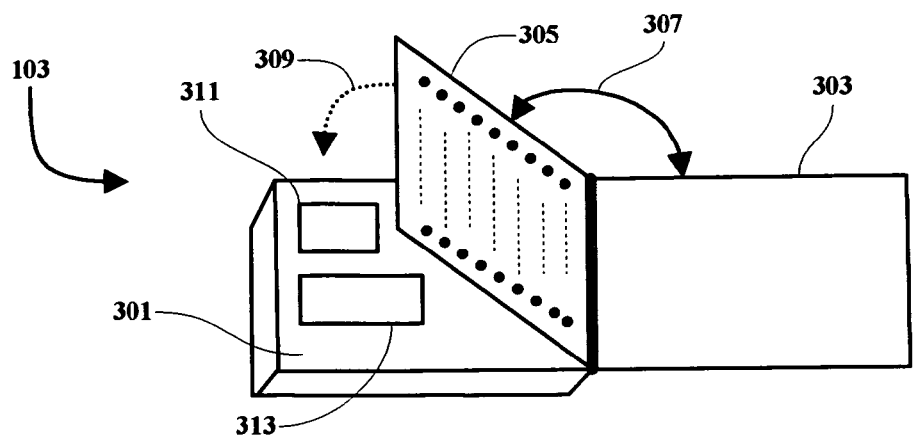
FIG. 3 is an illustration showing an expanded view of the scanning device of FIG. 1.

As shown in FIG. 3, a flatbed scanner device 103 includes a scanning surface 301 upon which documents 311 and 313 are placed, face down, for scanning. FIG. 3 also shows an array of light sensors 305 which is shown separate from the device cover 303 for illustration, but which may be included as part of the scan device cover 303 as indicated by the arrow 307. When a user wishes to scan documents 311 and 313, the documents 311 and 313 are placed face down on the scanning surface 301, the cover is closed 309 and the scanning operation is initiated typically by pressing a "Scan Documents" button (not shown) on the scanning device.

When the scanner 103 scans a document, the light from the scanner lamp 411 on a first side of the transparent scanning surface (which may be a glass plate) 401 will be obscured or blocked by the documents from passing through the transparent scanning surface 401 and impinging upon the sensor array 305. The light sensors in the areas where the documents are not present, i.e. the spaces between the documents, will receive light after it passes through the transparent scanning surface 401 between the documents.

Figure 4:
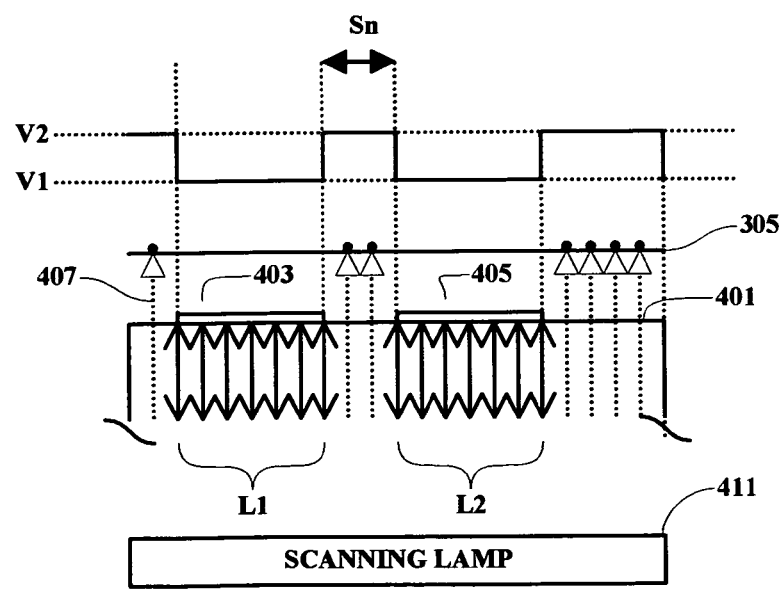
FIG. 4 is a schematic diagram illustrating several of the light paths within the scanning device.

As shown in FIG. 4, documents 403 and 405 are placed upon a scanning surface 401. Light L1 and L2 from the scanning lamp 411 is projected to illuminate the scanning surface 401 and the documents placed thereon from a first side of the scanning surface or below the scanning surface, but light from the scanning lamp 411 is blocked by the documents 403 and 405 from passing through the transparent scanning surface and impinging upon the sensor array 305. At the same time, some of the projected light, e.g. light ray 407, is not blocked by the documents 403 and/or 405 and travels directly from the scan lamp 411 through the transparent scanning surface to the light sensor array 305. This process produces electrical signals representative of the spaces between the documents 403 and 405, as well as the perimeter boundaries or edges of the documents. The perimeter boundaries or edges around the documents may be determined by analysis of the signals produced by the light sensor array 305. Where the signal is high Sn at a level V2 for example, light travels directly to the light sensor array and is not blocked by any document and may be interpreted as a blank space between documents. Where the signal is at a lower reference level V1, the light from the scanning lamp 411 has been blocked by a document 403 or 405 on the scanning surface 401 and this part of the signal may be interpreted as an area where documents have been placed. When the scan line signals for the entire scanning area are combined, the exact location of documents which have been placed on the scanning surface may be determined. The sensors of each scan receiving more light will be considered as the spaces between documents by the scanner. When multiple documents are placed on the scan surface for scanning, the document perimeter boundaries or edges for each of these documents will be determined using the above technique. There is at least some amount of vertical spacing and horizontal spacing between the documents and if such separation is not sensed, a separate window will not be created. The information about the document perimeter boundaries or edges will be communicated to the computer to which the scanner is connected.

The software that is used to preview the document copies will use the document boundary information to either: (1) open a separate window for each of the document page placed on the scanner for scanning (for example if two photos are placed on the scanner simultaneously, the software will open two preview windows where the user can preview the documents); or (2) if the software is configured to show all the documents in one single window for the preview, the software will open one single window to show the preview of the documents to be scanned.

The user may also select only certain ones of the displayed documents from which files are to be created. This option will be available on every preview window that gets opened if the software is configured to open a separate window for each document present on the scanning surface. If the software is configured to open just a single preview page, the option to open or not to create a soft copy file of every document being scanned will be presented in a display to the user next to the preview of each document. The software also enables a selection to scan multiple documents as a single document. This is to make sure that the user has the ability to create a single soft copy of the documents placed on the scan surface.

Figure 5:
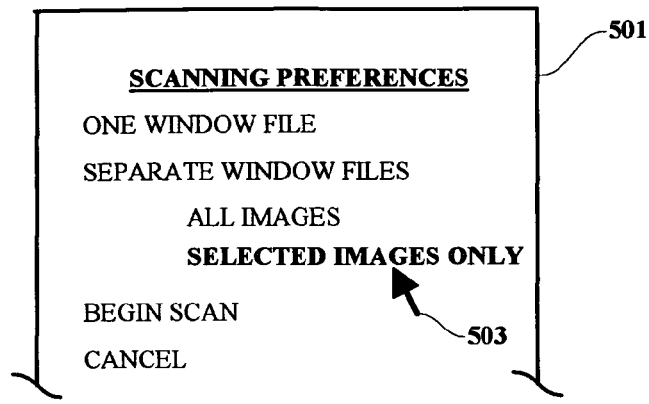
FIG. 5 is an exemplary screen display which may be used in association with the present invention.

An exemplary screen display 501 presented to a user is illustrated in FIG. 5. As shown, a user may select to open only "One Window File" to include all of the documents to be scanned, or the user may select "Separate Window Files" to include each document in a separate window file. If separate windows are selected, the user may then indicate that "Selected Images Only" are to be used in creating separate window files. This is accomplished by the user selecting and highlighting the "Selected Images Only" menu option using the user pointing device 503. With this option, all of the images of the documents would be presented to the user in a preview presentation and the user is then enabled to choose only selected ones of the presented images or documents from which the user wishes to have files created. The non-selected documents, although scanned for preview purposes, will not be used to create files. If the "Separate Window Files/All Images" selection were made by the user, separate files would be created for each of all of the documents placed on the scanning surface rather than files for only selected documents.

Figure 6:
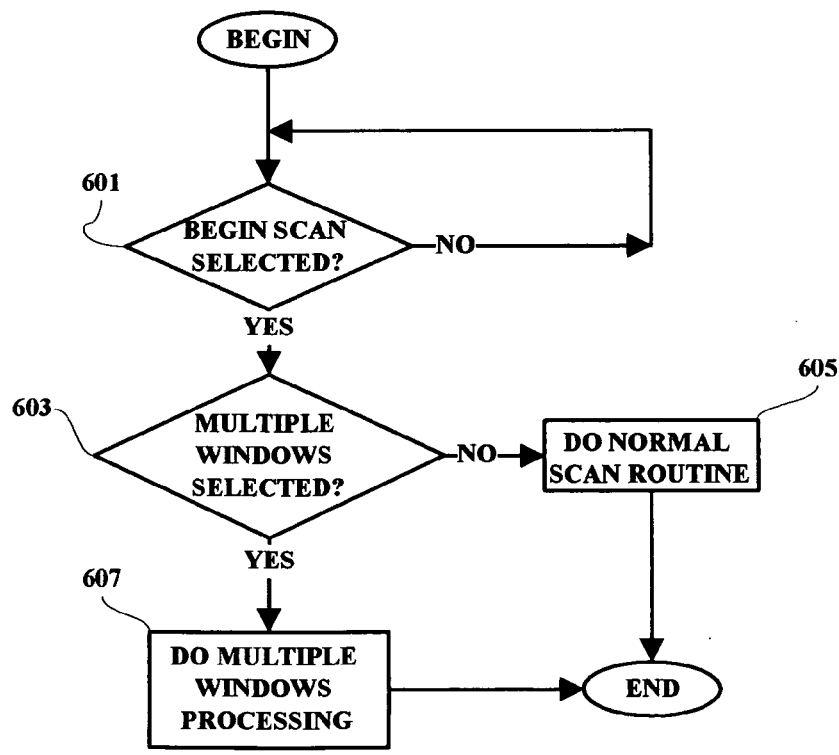
FIG. 6 is a flow chart illustrating an overall sequence in an exemplary operation of the present invention.

FIG. 6 shows a flow chart illustrating the broad concept included with the present invention. Initially a user places documents to be scanned on the scanning surface and presses a "Begin Scan" button on the scanning device. When a Begin Scan signal is detected 601 a determination is made as to whether the user has selected Multiple Windows 603. If Multiple Windows mode has not been selected 603, a normal scanning operation is conducted 605 in which a single file is created showing all of the images of documents placed on the scanning surface in one window. If the Multiple Windows option is selected 603 then the Multiple Windows operation 607 is initiated in which each document is displayed in a separate window. As hereinbefore discussed, the used is enable to have all of the document images used in creating separate files for each of the document images, or, alternatively, the user may choose to have only selected ones of the document images used in creating corresponding image files for only the selected images.

Figure 7:
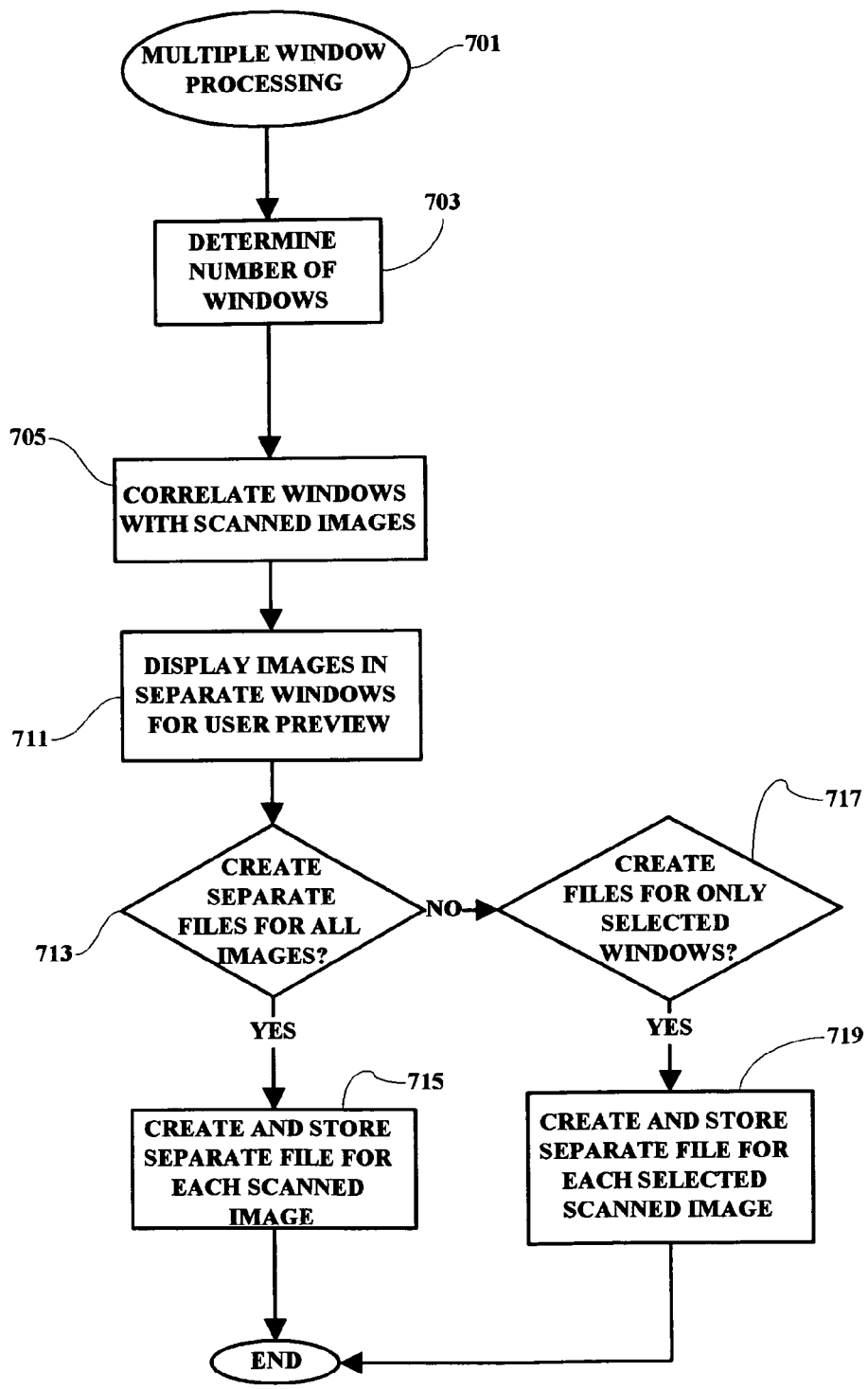
FIG. 7 is a detailed flow chart illustrating a more detailed operational sequence in an exemplary operation of the scanning methodology implemented in accordance with the present invention.

An exemplary sequence of operations for the Multiple Window Processing function is illustrated in FIG. 7. As shown, the processing function 701 initially determines the number of windows needed to be created 703. This will normally correspond to the number of documents placed and detected upon the scanning surface. The number of windows as detected by the sensor array 305 and associated circuitry will then be correlated to the images created by the scanning device or scanner 103 through manipulation and processing of the reflected light L1 and L2. As is known in the art, the images of the documents placed face-down on the scanning surface are created by the scanning device by reflecting the scanned document images along various paths below the scanning surface 301 and that hardware and methodology is not illustrated herein for the sake of clarity. It is noted, however, that the sensor array 305 above the scanning surface 301 and the related software as illustrated in the accompanying flow charts, are not known in conventional scanning devices and are incorporated as herein illustrated, to comprise an enhancement to flatbed scanners that enables a user selection to create separate windows and files for each of several documents which may be placed on a scanner surface. It is also contemplated that, although FIG. 3 represents a preferred embodiment, the enhancement of creating separate window files for each of several documents placed upon a scanning surface may be implemented solely through software processing and analysis of an image produced from an under-scanning of the entire scanning surface of a scanning device having several documents placed thereon.

After the scanned document images have been correlated to the sensed windows or perimeter boundaries 705, the document images are displayed in separate windows 711 for the user to preview. In this preview function, each window is displayed and a menu block (not shown) is also displayed next to each displayed window, to give the user a way to select one or more of the windows for which the user wishes to create a separate window file for the associated displayed document image. Next, a determination is made if the user has selected to create separate window files for all of the document images 713. If so, separate files are created and stored 715 for all of the document images and the process ends. If the user selects to create files for only selected ones of the displayed images 717, then the selected images are determined and scanned document files are created and stored 719 for only those selected images.

Figure 8:
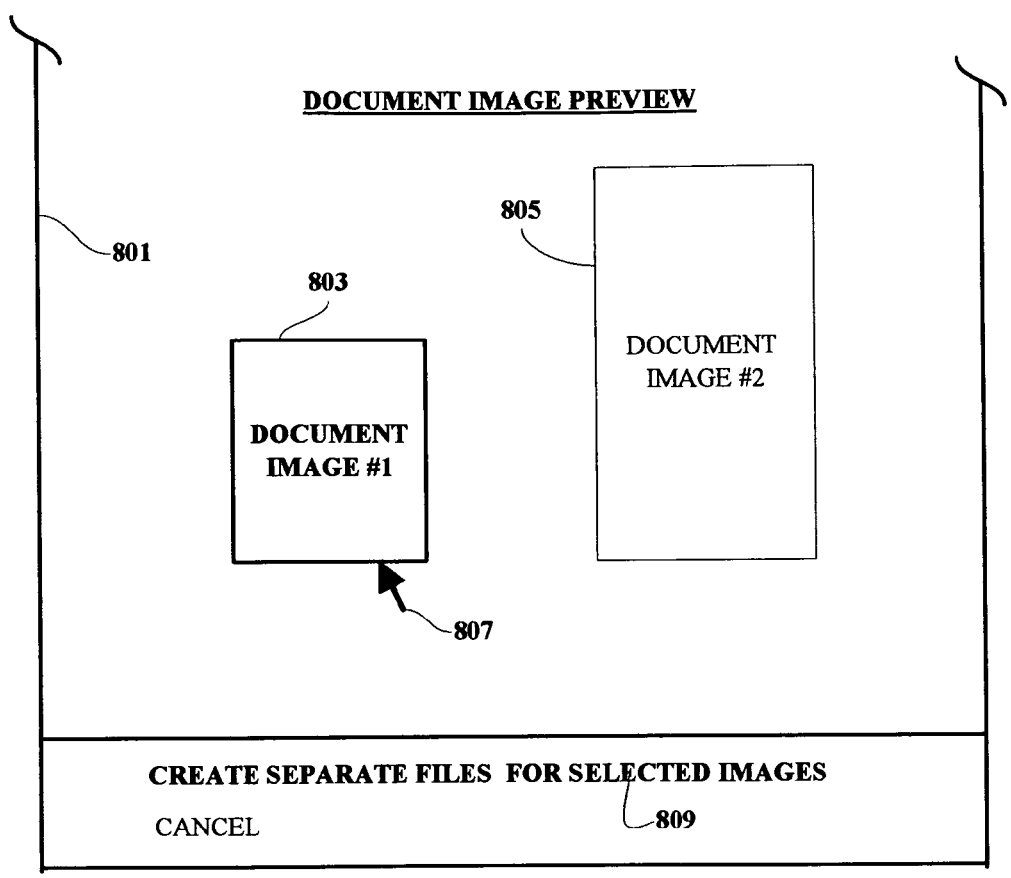
FIG. 8 is an example of a selection screen presented to a user in a document file preview mode.

FIG. 8 illustrates an example of a user selection screen 801 on a display device of a computer for example, in which a user is enabled to select which of a plurality of document images 803 and 805 is to be used to create separate document image files. This may be accomplished by positioning a pointer 807 to highlight the selected image 803 and then using the pointer 807 to highlight the text 809 to have the separate image file created for the selected document image 803. In this manner, a user is enabled to create separate document image files from one scanning of a plurality of documents placed upon the surface of a flat bed scanning device.

The method and apparatus of the present invention has been described in connection with a preferred embodiment as disclosed herein. The present invention may be implemented in many different combinations of hardware and software. The disclosed methodology may be implemented in a wide range of sequences to accomplish the desired results as herein illustrated. Although an embodiment of the present invention has been shown and described in detail herein, along with certain variants thereof, many other varied embodiments and combinations that incorporate the teachings of the invention may be easily constructed by those skilled in the art, and, at least in part, even included or integrated into a processor or CPU or other larger system integrated circuit or chip. The disclosed methodology may also be implemented partially in program code stored on a CD, disk or diskette (portable or fixed), or other memory medium or device, from which it may be loaded or transmitted to a memory device and executed to achieve the beneficial results as described herein. Accordingly, the present invention is not intended to be limited to the specific form set forth herein. On the contrary, it is intended to cover such alternatives, modifications, and equivalents, as can be reasonably included within the spirit and scope of the invention.

What is claimed is:

1. A method for operating a scanning device for providing separate image files for each of a plurality of documents which are positioned on a transparent scanning plate of said scanning device at the same time, said method comprising:
    scanning a plurality of documents placed on a first side of said transparent scanning plate, said scanning being accomplished from a second side of said transparent scanning plate opposite said first side to provide a total image of all of said plurality of said documents, said scanning being accomplished by using a scanning light for illumination of said plurality of documents from said second side;
    sensing received illumination from said scanning light directly passing through said transparent scanning plate and between said plurality of documents; and
    using said received illumination for determining perimeter boundaries surrounding each of said plurality of documents individually, said method further including creating separate document image files for each of said plurality of documents within separate ones of said perimeter boundaries.

2. The method as set forth in claim 1 wherein said sensing is accomplished by a light sensing apparatus comprised of an array of light sensing devices.

3. The method as set forth in claim 2 wherein said array of light sensing devices is arranged as an integral part of a scanning cover, said scanning cover being selectively positioned to cover said plurality of documents.

4. The method as set forth in claim 1 and further including:
    displaying individual document images of each of said plurality of documents within individual ones of said perimeter boundaries on a display device visible to said user.

5. The method as set forth in claim 4 and further including:
    enabling a user to select one or more of said document images presented on said display device; and
    creating a separate document image file for each document image selected by said user whereby said user is enabled to manage selected document image files as individual document image files separate from said total image of all of said plurality of documents.

6. A scanning system, said scanning system comprising a scanning device having a scanning surface upon which may be placed a plurality of documents at the same time for scanning, said scanning system further including a computer, said computer including a processor, memory, an input device and a display device, said scanning system being operable for scanning said plurality of documents from a first side of said scanning surface to provide a total image of all of said plurality of documents on said scanning surface, said scanning being accomplished by using a scanning light for illumination of said scanning surface from said first side of said scanning surface, said scanning system further including a sensing device for sensing received illumination on a second side of said scanning surface, said received illumination being light directly received from said scanning light emanating from said first side of said scanning surface and passing through said scanning surface between said plurality of documents, said sensing device being positioned adjacent to said second side of said scanning surface, said processor being operable to receive information from said sensing device to determine perimeter boundaries surrounding each of said plurality of documents individually, said system being further operable for creating separate document image files for each of said plurality of documents within separate ones of said perimeter boundaries.

7. The scanning system as set forth in claim 6 wherein said sensing is accomplished by a light sensing apparatus comprised of an array of light sensing devices.

8. The scanning system as set forth in claim 7 wherein said array of light sensing devices is arranged as an integral part of a scanning cover, said scanning cover being selectively positioned to cover said plurality of documents.

9. The scanning system as set forth in claim 6 wherein said system is further operable for enabling a presentation on said display device of individual document images of each of said plurality of documents within individual ones of said perimeter boundaries.

10. The scanning system as set forth in claim 9 wherein said computer is further operable for enabling a user to use said input device to select one or more of said document images, said computer being further operable for creating a separate document image file for each document image selected by said user whereby said user is enabled to manage selected document image files as individual document image files separate from said total image of all of said plurality of documents.

11. A scanning device comprising:
    scanning means arranged for scanning a plurality of documents placed on a first side of a transparent plate, said scanning being accomplished from a second side of said transparent plate opposite said first side to provide a total image of all of said plurality of documents placed on said first side of said transparent plate, said scanning being accomplished by using a scanning light for illumination of said plurality of documents from said second side;

sensing means positioned over said plurality of documents, said sensing means being operable for sensing received illumination from said scanning light directly passing through said transparent plate and between said plurality of documents;

processing means for using said received illumination received by said sensing means for determining perimeter boundaries surrounding each of said plurality of documents individually, said processing means being further operable for creating separate document image files for each of said plurality of documents within separate ones of said perimeter boundaries.

12. The scanning device as set forth in claim 11 wherein said sensing is accomplished by a light sensing apparatus comprised of an array of light sensing devices.

13. The scanning device as set forth in claim 12 wherein said array of light sensing devices is arranged as an integral part of a scanning cover, said scanning cover being selectively positioned to cover said plurality of documents on said first side of said transparent scanning plate.

* * * * *